J. A. MANNING.
DOLL HEAD.
APPLICATION FILED APR. 20, 1912.
1,047,259.
Patented Dec. 17, 1912.
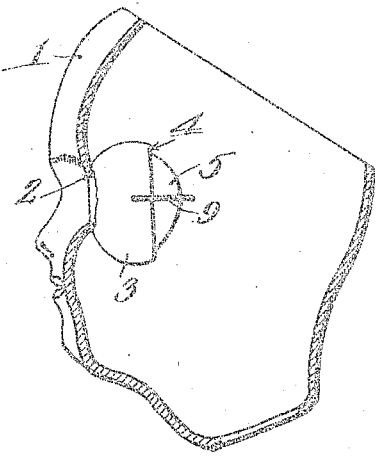
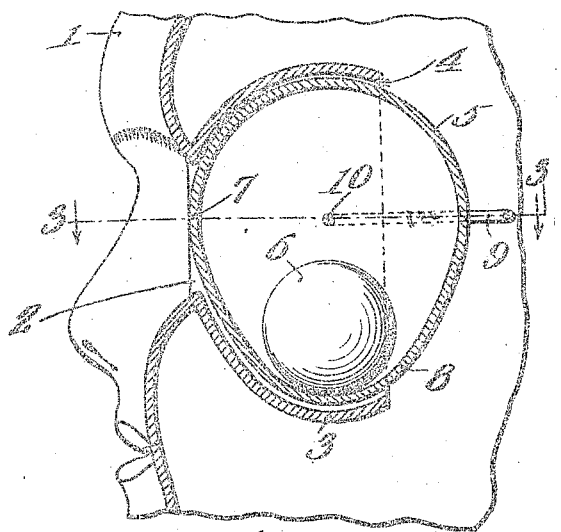
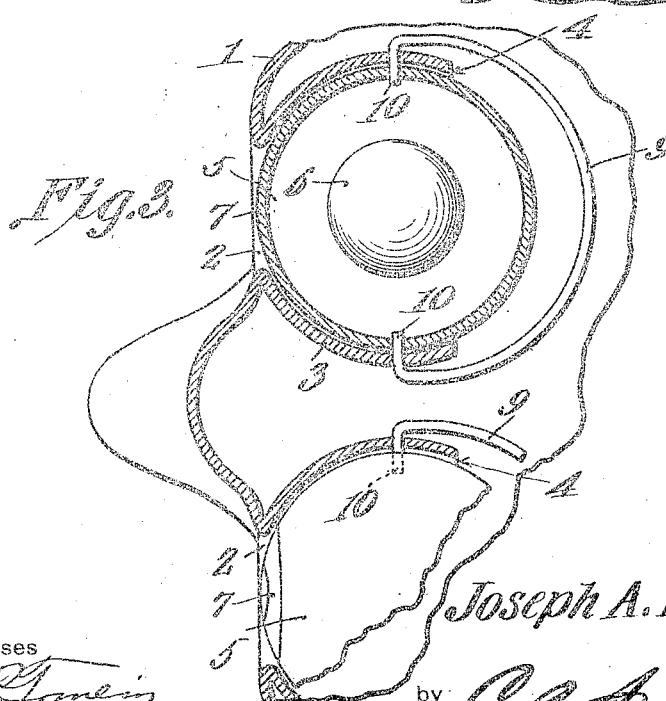
Joseph A. Manning,
Inventor
Witnesses
by
Attorneys

UNITED STATES PATENT OFFICE.

JOSEPH A. MANNING, OF PAWTUCKET, RHODE ISLAND.

DOLL-HEAD.

1,047,259.

Specification of Letters Patent.   Patented Dec. 17, 1912.

Application filed April 20, 1912. Serial No. 692,097.

*To all whom it may concern:*

Be it known that I, JOSEPH A. MANNING, a citizen of the United States, residing at Pawtucket, in the county of Providence and State of Rhode Island, have invented a new and useful Doll-Head, of which the following is a specification.

One object of the present invention is to provide novel means for actuating the eye of a doll so that the pupil of the eye will retire from view when the doll is disposed in a recumbent position.

A further object of the invention is to provide novel means for mounting the eye in the socket.

The invention aims further to provide an eye of a doll which will not be rendered inoperative by rough usage.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows in section, a doll head to which the eye constituting the subject-matter of the present invention has been applied, the eye appearing in elevation; Fig. 2 is a vertical section through the head and through the eye, parts appearing in elevation; and Fig. 3 is a horizontal section on the line 3—3 of Fig. 2.

In carrying out the invention there is provided a head 1 having the usual eye openings 2. The invention further includes a cup-shaped socket 3 secured to the head 1 about the opening 2, the socket 3 being, if desired, formed integrally with the head 1. The socket 3 is open at its rear end as indicated at 4. Mounted to turn within the socket 3 is an eye 5, and mounted to roll within the eye 5 is a ball 6. The pupil of the eye is indicated at 7 and is preferably fashioned by shaping the wall of the eye, the pupil 7 being, of course, ornamented in any desired manner. The eye 5 is oval in form, and at its lower end is fashioned a recess 8, at right angles to the pupil 7. A means is provided for pivotally supporting the eye 5 in the socket 3 for rotatory movement. This means preferably comprises a resilient bail 9 having angularly disposed fingers 10 which pass through the side walls of the socket 3 and enter the eye 5, to constitute a pivotal mounting for the eye. The resiliency of the bail 9 permits the fingers 10 to be sprung readily into engagement with the socket 3 and with the eye 5. The fingers 10 enter the eye 5 slightly above a horizontal plane passed through the center of gravity of the eye, so that when the head 1 is vertically disposed, the pupil 7 will tend to remain opposite the opening 2.

As will be understood readily, when the head 1 is vertically disposed, the ball 6 will register in the recess 8 in the lower end of the eye 5 and maintain the pupil 7 opposite the opening 2. When, however, the head is placed in a horizontal or recumbent position, the ball 6, rolling within the eye 5, will tend to cause the pupil 7 to retire from view.

The socket 3 and the eye 5, together with the remaining portions of the device, are preferably fashioned from metal, and the structure, therefore, is indestructible to a high degree.

Having thus described the invention, what is claimed is:—

1. A device of the class described comprising a socket; an eye mounted to turn in the socket; and a rolling element inclosed within the eye.

2. A device of the class described comprising an eye; means for supporting the eye for rotatory movement; and a rolling element within the eye.

3. A device of the class described comprising an eye having a pupil and a recess disposed at right angles to each other; a rolling element located within the eye and adapted to seat in the recess; and means for supporting the eye for rotatory movement.

4. A device of the class described comprising an eye; a rolling element located within the eye; and means for eccentrically supporting the eye for rotatory movement.

5. A device of the class described comprising a socket; an eye located within the socket; oppositely disposed pivot elements engaged with the socket and with the eye; and a rolling element within the eye.

6. A device of the class described comprising a socket; an eye located within the socket; a rolling element within the eye; and a bail having fingers engaged with the socket and with the eye.

In testimony that I claim the foregoing as my own, I have hereto affixed my signature in the presence of two witnesses.

JOSEPH A. MANNING.

Witnesses:
 VICTOR L. BLANCHARD,
 MARIE M. PREMIERE.